(12) United States Patent  
Yasuda

(10) Patent No.: US 8,441,725 B2  
(45) Date of Patent: May 14, 2013

(54) OPTICAL IMAGE STABILIZER AND OPTICAL APPARATUS

(75) Inventor: Hiromu Yasuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 266 days.

(21) Appl. No.: 13/038,164

(22) Filed: Mar. 1, 2011

(65) Prior Publication Data

US 2011/0216413 A1    Sep. 8, 2011

(30) Foreign Application Priority Data

Mar. 3, 2010 (JP) .................................. 2010-046597

(51) Int. Cl.
G02B 27/64 (2006.01)

(52) U.S. Cl.
USPC .......................................................... 359/554

(58) Field of Classification Search .................. None
See application file for complete search history.

(56) References Cited

U.S. PATENT DOCUMENTS 8,086,097 B2 * 12/2011 Sato .................................. 396/55

FOREIGN PATENT DOCUMENTS

JP    2005-070113 A    3/2005

* cited by examiner

Primary Examiner — Derek S Chapel
(74) Attorney, Agent, or Firm — Rossi, Kimms & McDowell LLP

(57) ABSTRACT

The optical image stabilizer includes a shift member holding an image stabilizing element and being movable with respect to a center axis, a lock member disposed around the shift member and rotatable about the center axis between a lock position to limit movement of the shift member and an unlock position to release the limit of the movement of the shift member, and a base member including a supporting portion to rotatably support the lock member. The shift member includes protrusions at its plural circumferential places. The lock member includes, in its inner circumferential part, locking portions to receive contact of the protrusions at the lock position so as to limit the movement of the shift member. The supporting portion is formed so as to include plural openings allowing contact of the protrusions with the lock portions and so as to support the inner circumferential part of the lock member.

4 Claims, 7 Drawing Sheets

OPTICAL IMAGE STABILIZER AND OPTICAL APPARATUS

BACKGROUND OF THE INVENTION

1. Field of the Invention

The present invention relates to an optical image stabilizer capable of reducing (correcting) image blur due to shaking of an optical apparatus such as a camera or an interchangeable lens.

2. Description of the Related Art

Such an optical image stabilizer corrects the image blur by moving (shifting) a correction lens constituting part of an image taking optical system or an image sensor photoelectrically converting an object image formed by the image taking optical system, with respect to a center axis (in other words, an optical axis of the image taking optical system). The correction lens and the image sensor are hereinafter collectively referred to as an "image stabilizing element".

However, when nonuse of the optical image stabilizer is selected by a user or power supply of the optical apparatus is turned off, it is necessary to limit the movement (shift) of the image stabilizing element to keep it at a center of its movable range.

Therefore, many conventional optical image stabilizers include, as disclosed in Japanese Patent Laid-Open No. 2005-070113, a lock mechanism that mechanically keeps the image stabilizing element at the center of its movable range. The lock mechanism includes plural protrusions provided on an outer circumferential part of a shift member that holds the image stabilizing element and is movable integrally therewith, and a lock member that is rotatable about the center axis between a lock position to come into contact with the protrusions so as to limit the movement of the shift member and an unlock position to release the lock of the movement of the shift member.

The lock member is a ring-shaped member, and is rotatably supported by a supporting portion formed in a base member of the optical image stabilizer. Moreover, the lock member includes, at its inner circumferential part, lock portions coming into contact with the protrusions of the shift member so as to limit the movement of the shift member to bring the shift member into a locked state. Furthermore, the lock member is rotationally driven by a lock actuator such as a stepping motor.

However, as disclosed in Japanese Patent Laid-Open No. 2005-070113, the conventional optical image stabilizers generally employ a configuration in which the supporting portion of the base member rotatably supports an outer circumferential part of the lock member, and the lock member rotates while its outer circumferential part slides with respect to the supporting portion. Such a configuration easily increases friction between the rotating lock member and the supporting portion, which causes problems that the size of the lock actuator may be increased and smooth rotation of the lock member may be prevented.

SUMMARY OF THE INVENTION

The present invention provides an optical image stabilizer capable of reducing the friction generated due to the rotation of the lock member, and an optical apparatus including the same.

The present invention provides as an aspect thereof an optical image stabilizer including a shift member holding an image stabilizing element and being movable with respect to a center axis, a lock member disposed around the shift member and being rotatable about the center axis between a lock position to limit movement of the shift member and an unlock position to release the limit of the movement of the shift member, and a base member including a supporting portion to rotatably support the lock member. The shift member includes protrusions at its plural circumferential places. The lock member includes, in its inner circumferential part, locking portions to receive contact of the protrusions at the lock position so as to limit the movement of the shift member. The supporting portion is formed so as to include plural openings allowing contact of the protrusions with the lock portions and so as to support the inner circumferential part of the lock member.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

[Embodiment 1]

Figure 5:
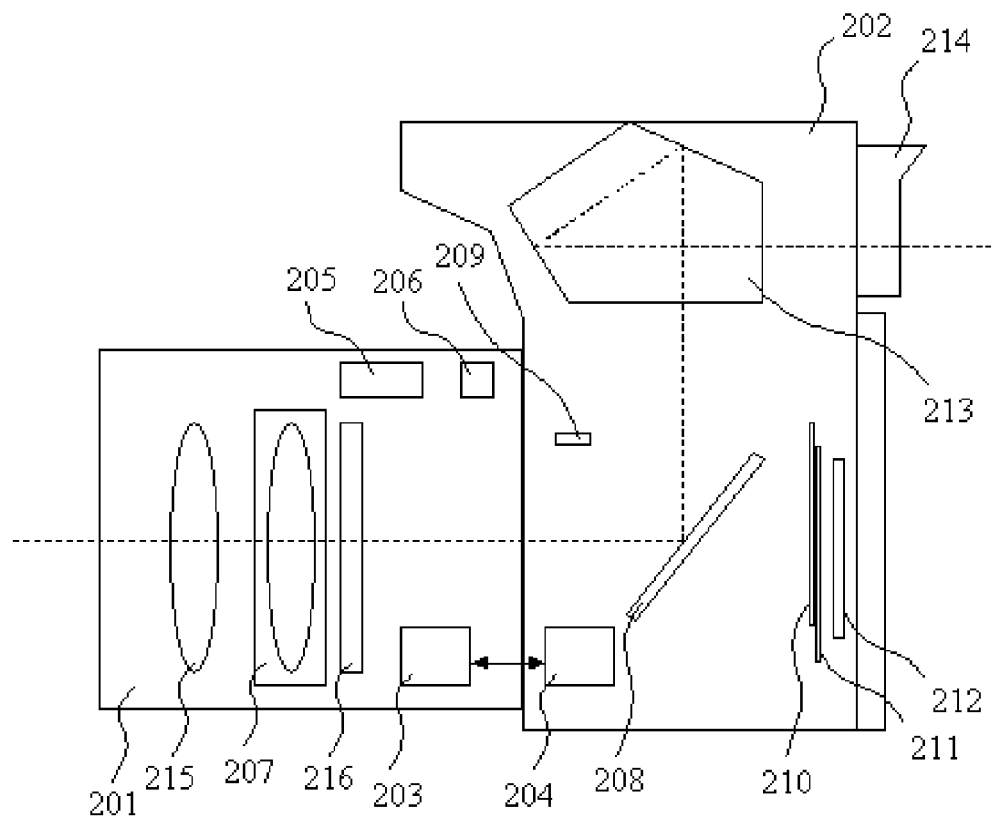
FIG. 5 shows a configuration of a camera system provided with the optical image stabilizer of Embodiment 1.

FIG. 5 shows a configuration of a camera system constituted by an interchangeable lens (optical apparatus) including an optical image stabilizer that is a first embodiment (Embodiment 1) of the present invention and a single-lens reflex digital camera to which the interchangeable lens is attached.

In FIG. 5, reference numeral 201 denotes the interchangeable lens, and reference numeral 202 denotes the single-lens reflex digital camera (hereinafter simply referred to as a "camera"). The interchangeable lens 201 is detachably attached to a mount portion of the camera 202.

Reference numeral 203 denotes a lens microcomputer constituted by a CPU or the like, which is provided in the interchangeable lens 201. Reference numeral 204 denotes a camera microcomputer constituted by a CPU or the like, which is provided in the camera 202. The lens microcomputer 203 and the camera microcomputer 204 can communicate to each other through communication contacts (not shown) provided on their mount portions.

In the interchangeable lens 201, reference numeral 205 denotes a yaw shake sensor that detects shaking of the interchangeable lens 201 in a yaw direction (horizontal direction), and reference numeral 206 denotes a pitch shake sensor that detects shaking of the interchangeable lens 201 in a pitch direction (vertical direction). The yaw and pitch shake sensors 205 and 206 are constituted by angular velocity sensors.

Reference numeral 207 denotes the optical image stabilizer including a correction lens that is an image stabilizing element. The optical image stabilizer 207 moves (shifts) the correction lens in a direction orthogonal to its optical axis (or a center axis of the optical image stabilizer 207 or an optical axis of an image taking optical system which will be described later) in response to the shaking of the interchangeable lens 201 to reduce (correct) image blur due to the shaking of the interchangeable lens 201. In other words, the correction lens is moved with respect to the center axis. Reference numeral 215 denotes a focus lens that is moved in a direction of the optical axis (hereinafter referred to as an "optical axis direction") for focusing, and reference numeral 216 denotes an aperture stop that adjusts an amount of light from an object passing through the image taking optical system. The focus lens 215, the correction lens, the aperture stop 216 and other lenses (not shown) constitute the image taking optical system forming an object image (optical image).

In the camera 202, reference numeral 208 denotes a quick return mirror that is rotatable between a down position (shown in the figure) to be disposed inside an optical path from the image taking optical system and an up position to be retracted outside the optical path. Reference numeral 209 denotes a stopper to stop the rotation of the quick return mirror 208 at the up position. Reference numeral 210 denotes a leading blade of a focal plane shutter, and reference numeral 211 denotes a trailing blade thereof.

Reference numeral 212 denotes an image sensor constituted by a CCD sensor or a CMOS sensor. Reference numeral 213 denotes a penta prism which introduces the light from the object that has been reflected by the quick return mirror 208 located at the down position to a viewfinder eyepiece lens 214.

Turn-on of a power switch (not shown) provided in the camera 202 activates the camera microcomputer 204 and the lens microcomputer 203.

The camera microcomputer 204 performs photometry and focus detection in response to a half-push operation of a release switch (not shown) provided in the camera 202. The photometry is performed by detecting, by using a photometry sensor (not shown), a part of the light from the object introduced to the penta prism 213. The focus detection is performed for detecting a focus state of the image taking optical system by detecting, by using an AF sensor (not shown), a part of the light from the object that has been transmitted through the quick return mirror 208 located at the down position and reflected by a sub-mirror (not shown). The focus detection may be performed by using a video signal generated based on an output from the image sensor 212.

The camera microcomputer 204 decides a shutter speed and an aperture value based on a result of the photometry. Moreover, the camera microcomputer 204 sends a focus control signal based on a result of the focus detection to the lens microcomputer 203. The lens microcomputer 203 controls a focus actuator (not shown) according to the focus control signal to move the focus lens 215 to an in-focus position, thus performing auto focus (AF).

In addition, in response to the half-push operation of the release switch, the lens microcomputer 203 starts control of an image blur correction operation (image stabilization operation) of the optical image stabilizer 207. Specifically, the lens microcomputer 203 integrates an angular velocity signal output from each of the yaw and pitch shake sensors 205 and 206 with the shaking of the interchangeable lens 201 to calculate an angular displacement amount and an angular displacement direction of the interchangeable lens 201. Then, the lens microcomputer 203 calculates a movement amount (shift amount) and a movement direction (shift direction) of the correction lens for reducing the image blur on the image sensor 212, and drives a yaw actuator and a pitch actuator, which will be described later, on the basis of the movement amount and direction.

The camera microcomputer 204 sends to the lens microcomputer 203, in response to a full-push operation of the release switch, an aperture stop control signal corresponding to the previously decided aperture value. The lens microcomputer 203 drives the aperture stop 216 according to the aperture stop control signal. Moreover, the camera microcomputer 204 causes the quick return mirror 208 to rotate to the up position, and causes the leading blade 210 and the trailing blade 211 of the shutter to open and close at the previously decided shutter speed. Thus, the image sensor 212 is exposed.

The image sensor 212 photoelectrically converts the object image formed by the image taking optical system to output an image-pickup signal as an electrical signal. An image processing circuit in the camera microcomputer 204 performs various signal processing on the image-pickup signal to generate a video signal. The video signal is displayed on a rear monitor provided in the camera 202, and recorded to a recording medium such as a semiconductor memory.

Figure 1:
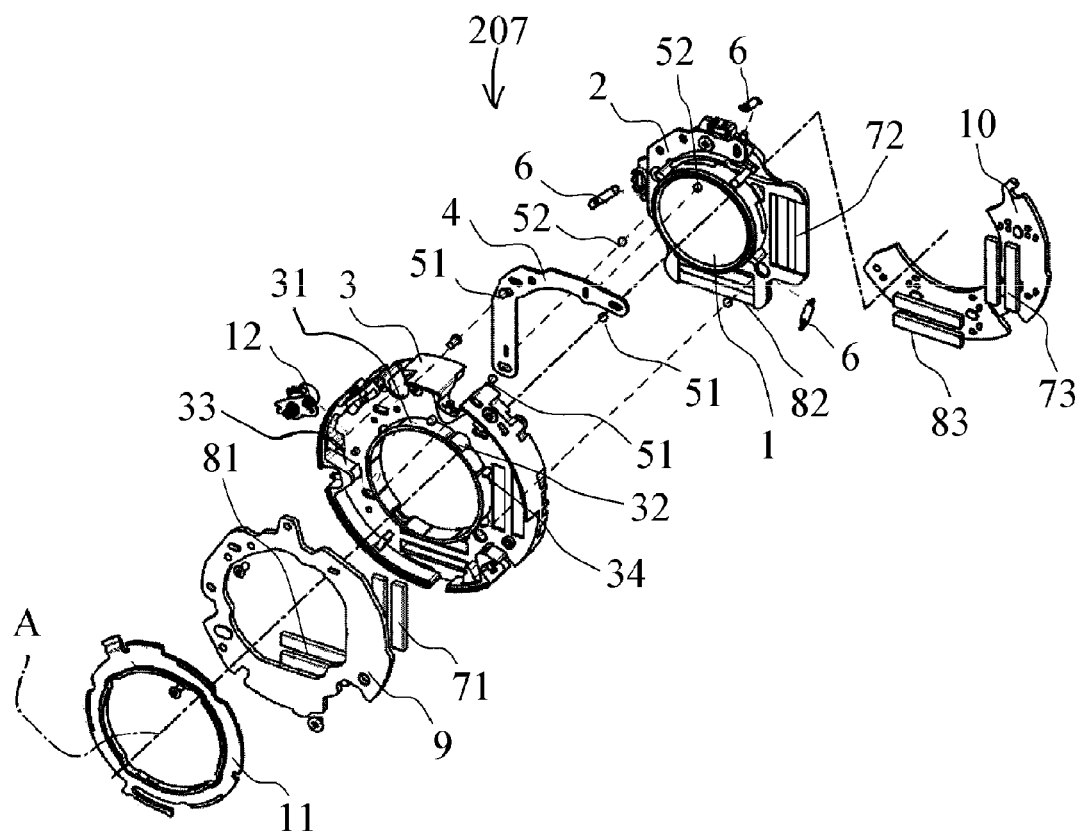
FIG. 1 is an exploded perspective view showing a configuration of an optical image stabilizer that is Embodiment 1 of the present invention.
Figure 2:
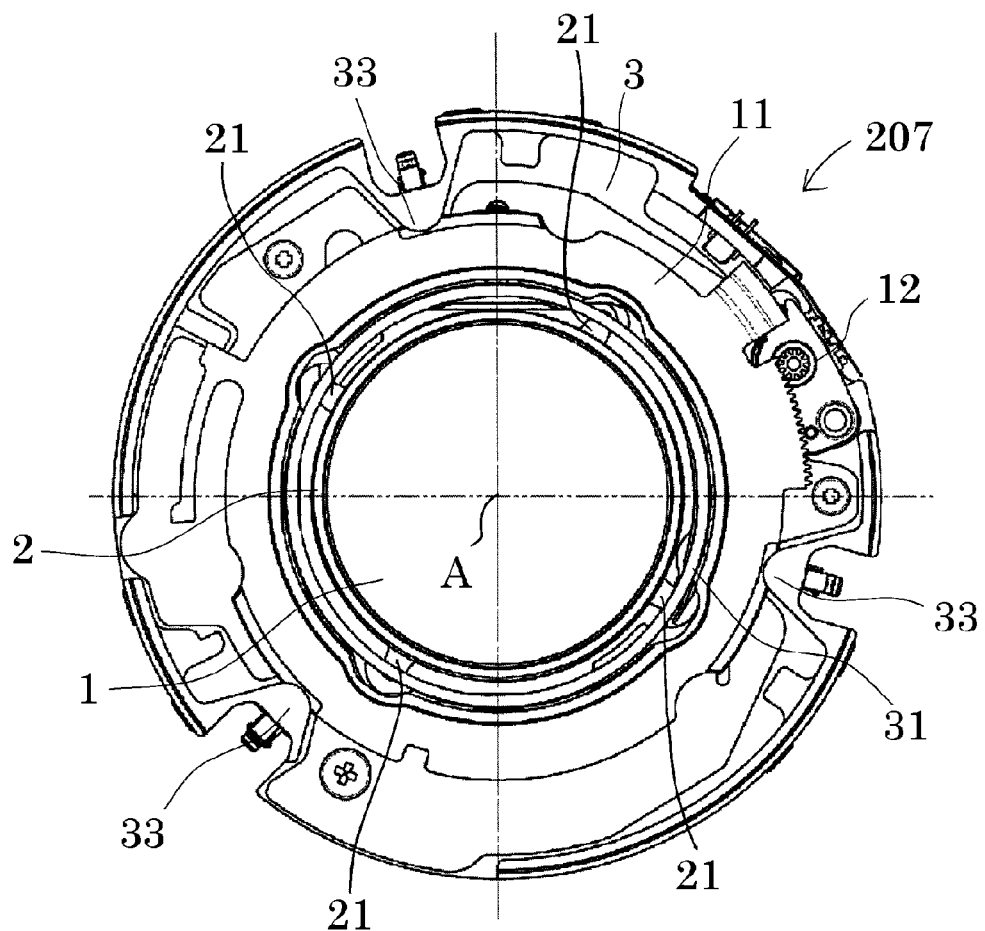
FIG. 2 is a front view of the optical image stabilizer of Embodiment 1 (a cross-sectional view showing a cross-section cut along a B-B line in FIG. 3).
Figure 3:
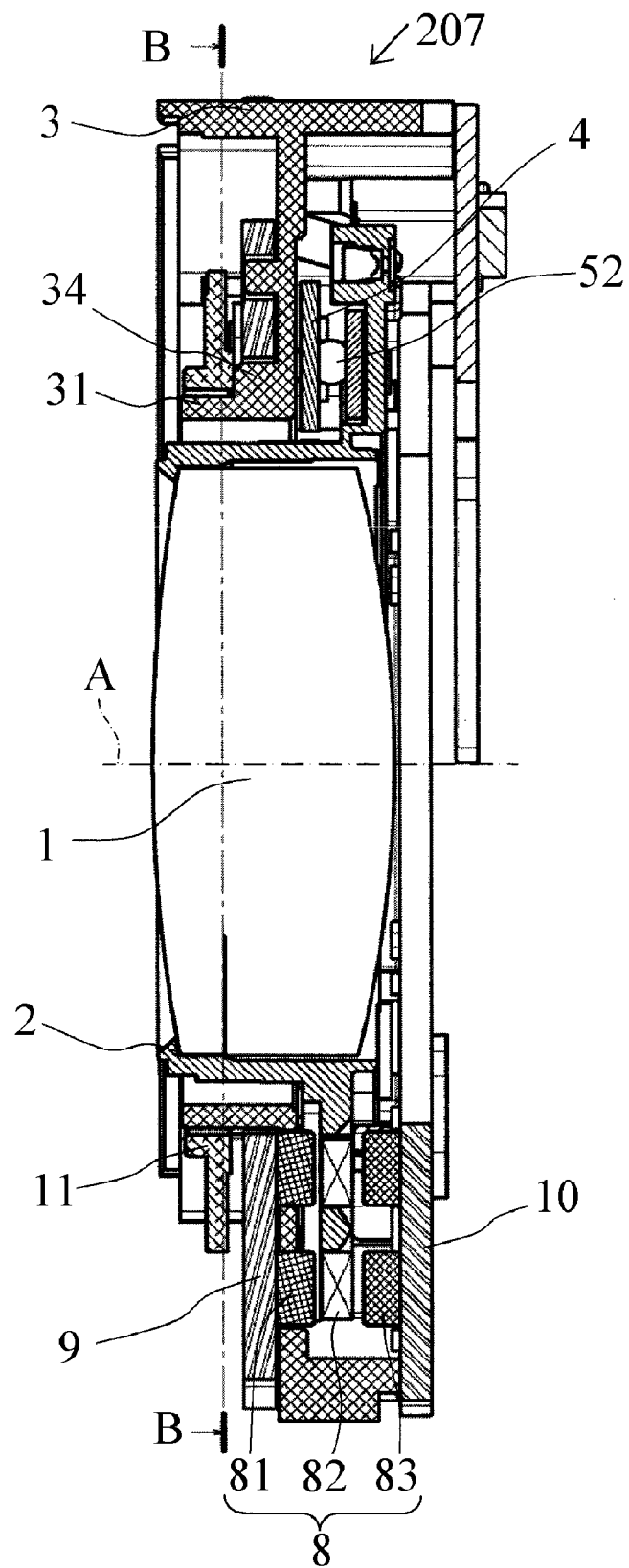
FIG. 3 is a cross-sectional view of the optical image stabilizer of Embodiment 1.
Figure 4A:
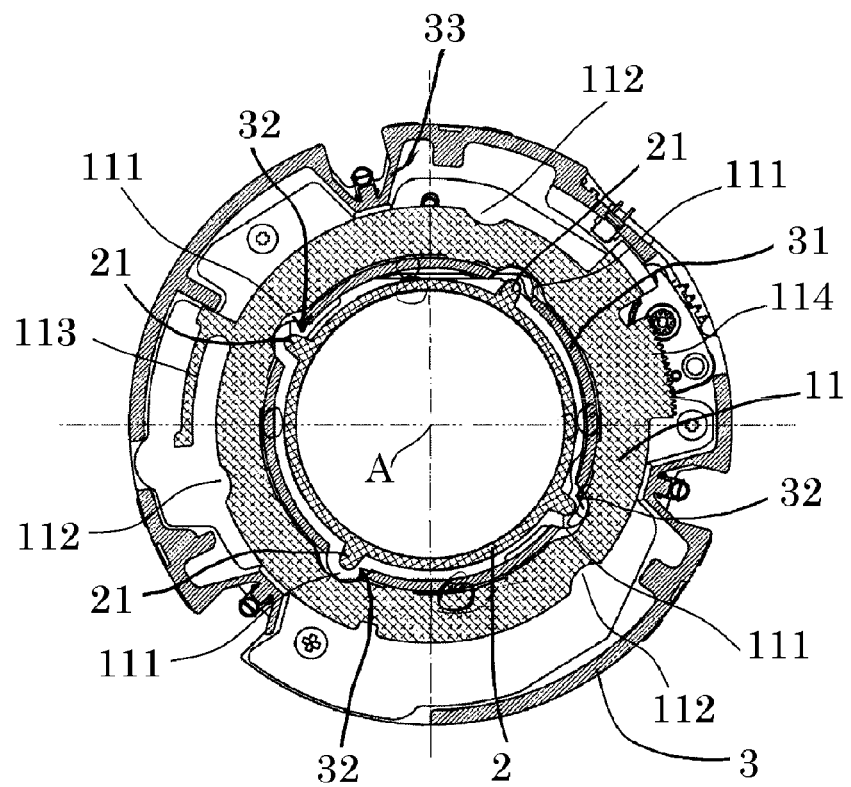
FIGS. 4A and 4B show movement of a lock ring in the optical image stabilizer of Embodiment 1.
Figure 4B:
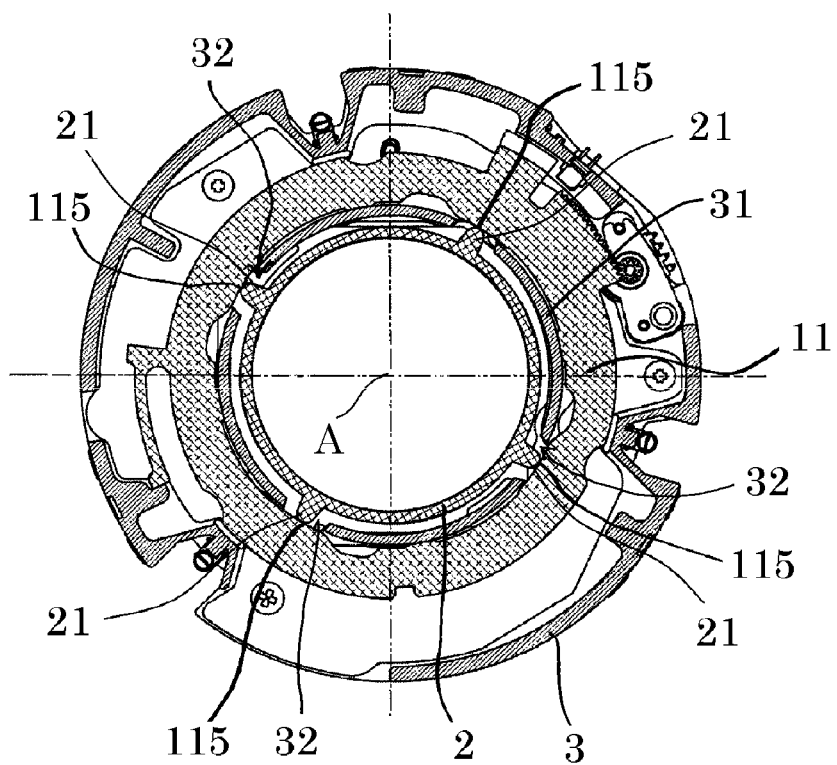

Next, description will be made of a configuration of the optical image stabilizer 207 with reference to FIGS. 1, 2, 3, 4A and 4B. FIG. 1 is an exploded view of the optical image stabilizer 207. FIG. 2 shows a cross-section of the optical image stabilizer 207 viewed from a direction in which the center axis (optical axis) A of the optical image stabilizer 207 extends. The direction in which the center axis A extends is hereinafter referred to as a "center axis direction" or an "optical axis direction". Moreover, FIG. 3 shows a cross-section of the optical image stabilizer 207 cut along the center axis A. In addition, FIGS. 4A and 4B shows movement of a lock ring, which will be described later.

The optical image stabilizer 207 includes the above-described correction lens 1, a shift barrel 2 as a shift member, a base plate 3 as a base member, a rotation preventing plate 4, plural (three) first balls 51, plural (three) second balls 52 and plural (three) biasing springs 6. In addition, the optical image stabilizer 207 includes the yaw actuator 7, the pitch actuator 8, a first yoke 9, a second yoke 10, the lock ring 11 as a lock member and the lock actuator 12.

The shift barrel 2 holds the correction lens 1, and is movable (shiftable) together with the correction lens 1 in a direction orthogonal to the optical axis. The direction orthogonal to the optical axis is hereinafter also referred to as a "radial direction". The shift barrel 2 is provided with locking protrusions 21 formed at plural circumferential places (four places in this embodiment) on an outer circumferential part of the shift barrel 2. A circumcircle of the four locking protrusions 21 is approximately identical to that of a lock ring supporting portion 31 which is formed in the base plate 3 and will be described later.

A yaw coil 72 and a pitch coil 82 are fixed to the shift barrel 2. Moreover, ball receiving portions to receive contact of the three second balls 52 and spring holding portions to hold one ends of the three biasing springs 6 are respectively formed at three circumferential places in the shift barrel 2.

The base plate 3 is fixed to a fixed barrel (not shown) as a chassis which is provided in the interchangeable lens 201 shown in FIG. 1. The base plate 3 includes at its central part an opening inside which the shift barrel 2 is disposed. A lock ring supporting portion 31 having a cylindrical shape is formed around the opening in the base plate 3. The lock ring supporting portion 31 supports at its outer circumferential part an inner circumferential part of the lock ring 11 such that the lock ring 11 is rotatable about the center axis.

In the lock ring supporting portion 31, openings 32 are formed at four circumferential places whose phases are identical to those of the four locking protrusions 21 in the shift barrel 2. That is, the lock ring supporting portion 31 has a cylindrical shape including the openings 32 at the four circumferential places. Each locking protrusion 21 extends inside the opening 32 outward in the radial direction, that is, toward the lock ring 11. This enables contact of the locking protrusions 21 with locking portions that are formed in the lock ring 11 and will be described later. Each opening 32 has a circumferential width sufficient to prevent contact of the locking protrusion 21 with the lock ring supporting portion 31 even if the shift barrel 2 is moved to perform the image blur correction operation.

It is desirable that the phases at which the openings 32 are formed be different from those at which the yaw actuator 7 and the pitch actuator 8 are arranged. Such setting of the phases of the openings enables setting of arrangement spaces for the yaw actuator 7 and the pitch actuator 8 to a further inner side in the radial direction, which enables miniaturization of the optical image stabilizer 207.

Moreover, an inner diameter of the lock ring supporting portion 31 is set to be equal to a sum of an outer diameter of a cylindrical portion of the shift barrel 2 other than the locking protrusions 21 and a maximum movable amount of the shift barrel 2. Therefore, an inner circumferential surface of the lock ring supporting portion 31 forms, in the movement direction of the shift barrel 2, a mechanical end to receive contact of an outer circumferential surface of the cylindrical portion of the shift barrel 2 so as to limit a further movement of the shift barrel 2.

Lock ring retaining portions 33 extending inward in the radial direction are formed at three circumferential places in an area of the base plate 3 further outside than the lock ring supporting portion in the radial direction. Lock ring retaining protrusions 34 are formed at plural places on an outer circumferential surface of the lock ring supporting portion 31. The lock ring retaining portions 33 and the lock ring retaining protrusions 34 are formed so as to separate from each other by a distance corresponding to a thickness of the lock ring 11 in the center axis direction. The lock ring 11 is disposed between these lock ring retaining portions 33 and lock ring retaining protrusions 34, and thereby movement of the lock ring 11 in the center axis direction is prevented.

In the base plate 3, spring holding portions are provided which hold other ends of the three biasing springs 6 whose one ends are held by the spring holding portions provided in the shift barrel 2. These biasing springs 6 bias the shift barrel 2 toward the base plate 3 in the center axis direction.

The rotation preventing plate 4 is disposed between the shift barrel 2 and the base plate 3. The three first balls 51 are disposed between first ball receiving portions formed in the base plate 3 and second ball receiving portions formed in the rotation preventing plate 4, the first and second ball receiving portions being respectively formed at three circumferential places in the base plate 3 and the rotation preventing plate 4 and extending in the pitch direction. Moreover, the three second balls 52 are disposed between third ball receiving portions formed in the rotation preventing plate 4 and fourth ball receiving portions formed in the shift barrel 2, the third and fourth ball receiving portions being respectively formed at three circumferential places in the rotation preventing plate 4 and the shift barrel 2 and extending in the yaw direction.

Biasing forces generated by the biasing springs 6 cause the shift member 2 and the base plate 3 to sandwich therebetween the second balls 52, the rotation preventing plate 4 and the first balls 51. This prevents movement of the shift barrel 2 in the center axis direction. Moreover, the shift barrel 2 is held movably in the yaw and pitch directions while its rotation about the center axis is prevented, by engagement of the first balls 51 with the first and second ball receiving portions formed in the base plate 3 and the rotation preventing plate 4 and engagement of the second balls 52 with the third and fourth ball receiving portions formed in the rotation preventing plate 4 and the shift barrel 2.

The above-described holding structure for the shift barrel 2 is an example, and other holding structures may be used.

The yaw actuator 7 and the pitch actuator 8 are constituted by voice coil motors (VCM).

The yaw actuator 7 includes a first yaw magnet 71 fixed to the first yoke 9 by being attracted thereby, the first yoke 9 being attached to a part of the base plate 3 opposite to the shift barrel 2, and a yaw coil 72 fixed to the shift barrel 2. Moreover, the yaw actuator 7 includes a second yaw magnet 73 fixed to the second yoke 10 by being attracted thereby, the second yoke 10 being connected to the base plate 3 at an opposite side to the base plate 3 with respect to the shift barrel 2. Energization of the yaw coil 72 generates a driving force to move the shift barrel 2 in the yaw direction.

The pitch actuator 8 includes a first pitch magnet 81 fixed to the first yoke 9 by being attracted thereby, a pitch coil 82 fixed to the shift barrel 2, and a second pitch magnet 83 fixed to the second yoke by being attracted thereby. Energization of the pitch coil 82 generates a driving force to move the shift barrel 2 in the pitch direction.

An inner diameter of the lock ring 11 is approximately equal to an outer diameter of the lock ring supporting portion 31. Thus, the inner circumferential part of the lock ring 11 is rotatably supported by the outer circumferential part of the lock ring supporting portion 31.

As shown in FIGS. 4A and 4B, at four circumferential places in the inner circumferential part of the locking ring 11, unlocking concave portions 111 are formed. The unlocking concave portions 111 are arranged at same phases as those of the locking protrusions 21 of the shift barrel 2 in a state where the lock ring 11 is rotated to the unlocked position shown in FIG. 4A. In such arrangement, the lock ring 11 never comes into contact with the locking protrusions 21, and therefore the movement of the shift barrel 2 for the image blur correction operation is not limited. This state where the limitation of the movement of the shift barrel 2 in the radial direction is released (unlocked) is hereinafter referred to as an "unlocked state" of the shift barrel 2.

On the other hand, in the inner circumferential part of the lock ring 11, four portions respectively adjacent to the unlocking concave portions 111 are formed as the locking portions 115. That is, in the lock ring 11, the locking portions 115 and the inner circumferential part supported by the lock ring supporting portion 31 of the shift barrel 2 are arranged on a same circle (that is, are concyclic). The locking portions 115 are arranged, in a state where the lock ring 11 is rotated to the lock position shown in FIG. 4B, at same phases as those of the locking protrusions 21 of the shift barrel 21 and come into contact with the locking protrusions 21 so as to limit (prevent) the movement of the shift barrel 2. This state where the movement of the shift barrel 2 in the radial direction is limited (locked) is hereinafter referred to as a "locked state" of the shift barrel 2.

In the outer circumferential part of the lock ring 11, assembling concave portions 112 and a hook 113 are formed. When the lock ring 11 is assembled to the base plate 3, the lock ring 11 is placed around the lock ring supporting portion 31 while the phase of the assembling concave portions 112 are aligned to those of the lock ring retaining portions 33. Then, the locking ring 11 is rotated while the hook 113 is elastically deformed inward in the radial direction.

The lock ring 11 thus assembled to the base plate 3 is rotatable about the center axis between the unlock position shown in FIG. 4A and the lock position shown in FIG. 4B. A base end and a tip end of the hook 113 come into contact with stoppers formed at two circumferential places in the base plate 3 respectively at the unlock position and the lock position, which prevents further rotation of the lock ring 11.

A gear 114 that engages with an output gear of the lock actuator 12 constituted by a stepping motor is formed partially in the outer circumferential part of the lock ring 11. Thereby, rotation of the lock actuator 12 can rotate the lock ring 11 to the lock position and the unlock position. As the lock actuator 12, any other actuator than the stepping motor such as a DC motor or a VCM may be used.

To cause the optical image stabilizer 207 thus configured to perform the image blur correction operation, the lock ring 11 is rotated to the unlock position by the lock actuator 12 to set the shift barrel 2 to the unlocked state. Then, as described above, the lens microcomputer 203 drives the yaw actuator 7 and the pitch actuator 8 based on the angular velocity signals output from the yaw and pitch shake sensors 205 and 206.

To inhibit the image blur correction operation when using a tripod for fixing the camera system, performing image capturing with a high-speed shutter or carrying the camera system with its power supply being turned off, the lock ring 11 is rotated to the lock position by the lock actuator 12 to set the shift barrel 2 to the locked state. In the locked state, the shift barrel 2 is held to a position at which the optical axis of the correction lens 1 matches the optical axis of the image taking optical system.

However, in order to ensure smooth rotation of the lock ring 11 between the lock position and the unlock position, a gap may be provided between the locking protrusions 21 and the locking portions 115 of the lock ring 11. The gap should have a size within a range in which a displacement amount of the optical axis of the correction lens 1 with respect to that of the image taking optical system in the locked state is allowable to maintain good optical performance.

In the optical image stabilizer 207 thus configured, the lock ring 11 is rotatably supported at its inner circumferential part by the lock ring supporting portion 31. Frictional torque generated between the lock ring 11 being rotated and a supporting member that supports the lock ring 11 increases in proportion to a radius of a sliding portion between the lock ring 11 and the supporting member.

Therefore, supporting the lock ring 11 at its inner circumferential part whose radius (diameter) is smallest in the lock ring 11 by the lock ring supporting portion 31 can decrease the frictional torque as compared with a case of supporting the lock ring 11 at its outer circumferential part.

For example, when the lock ring 11 in this embodiment has an inner diameter of 33.6 mm and an outer diameter of 45.2 mm, supporting the inner circumferential part of the lock ring 11 can degrease the frictional torque by 26% as compared with the case of supporting the outer circumferential part of the lock ring 11.

Such a supporting configuration makes it possible to reduce an output torque required for the lock actuator 12, which enables miniaturization and power saving of the lock actuator 12 and miniaturization of the optical image stabilizer 207.

Moreover, if supporting the lock ring 11 at its outer circumferential part, it is necessary to provide, at plural circumferential places in the base plate 3, guiding portions that support the outer circumferential part of the lock ring 11. Providing such guiding portions complicates the shape of the base plate 3, which may cause undesired deformation of the guiding portions with thermal contraction or expansion of the base plate 3 due to its temperature change, thereby preventing smooth rotatable support of the lock ring 11.

On the other hand, in this embodiment the lock ring 11 is supported by the lock ring supporting portion 31 having a highly symmetric cylindrical shape. Therefore, even if the thermal contraction or expansion of the base plate 3 is generated, the lock ring supporting portion 31 may only be deformed while maintaining its cylindrical shape, almost without being deformed such that its cylindrical shape is distorted, which can ensure the smooth rotatable support of the lock ring 11.

Moreover, in the lock ring 11 in this embodiment, the inner circumferential part rotatably supported by the lock ring supporting portion 31 and the locking portions 115 coming into contact with the locking protrusions 21 of the shift barrel 2 are arranged on the same circle. If the locking portions 115 and the inner circumferential part of the lock ring are formed on circles different from each other, centers thereof may be displaced from each other, which makes it necessary to provide a large gap between the locking portions 115 and the locking protrusions 21 for allowing the displacement. Such a large gap increases a movable amount of the shift barrel 2 in the radial direction in the locked state, which unpreferably allows displacement of the optical axis of the correction lens 1 from that of the image taking optical system, thereby deteriorating optical performance.

On the other hand, according to this embodiment, the inner circumferential part and the locking portions 115 of the lock ring 11 have no inner diameter difference, which makes it possible to reduce the size of the gap between the locking portions 115 and the locking protrusions 21 of the shift barrel 2, thereby decreasing the movable amount of the shift barrel 2 in the radial direction in the locked state. Therefore, the optical performance in the locked state can be improved.

The locking portions 115 of the lock ring 11 may be provided further outside in the radial direction than the inner circumferential part thereof rotatably supported by the lock ring supporting portion 31. In this case, the circumcircle of the locking protrusions is set to be larger in diameter than that of the lock ring supporting portion 31 and equal to that of the locking portions 115. Not providing the inner circumferential part and the locking portions 115 of the lock ring 11 on a same circle slightly reduces the gap size reduction effect, but can provide an effect that facilitates size management of the lock ring 11.

Moreover, in this embodiment the lock ring supporting portion 31 forms the mechanical end for the shift barrel 2 in its movement direction (radial direction) in the unlocked state. Therefore, it is not necessary to provide a portion for forming such a mechanical end separately from the lock ring supporting portion 31 in the base plate 3, which can simplify the shape of the base plate 3 and can miniaturize the base plate 3.

[Embodiment 2]

The optical image stabilizer of Embodiment 1 employs the configuration that the lock ring retaining portions 33 provided in the base plate 3 are in contact with outer circumferential side portions of the lock ring 11 so as to prevent the movement of the lock ring 11 in the center axis direction. On the other hand, an optical image stabilizer that is a second embodiment (Embodiment 2) of the present invention employs a configuration that lock ring retaining portions are provided so as to be in contact with inner circumferential side portions of a lock ring not only to prevent movement of the lock ring in a center axis direction, but also to further reduce frictional torque generated when the lock ring is rotated.

Figure 6A:
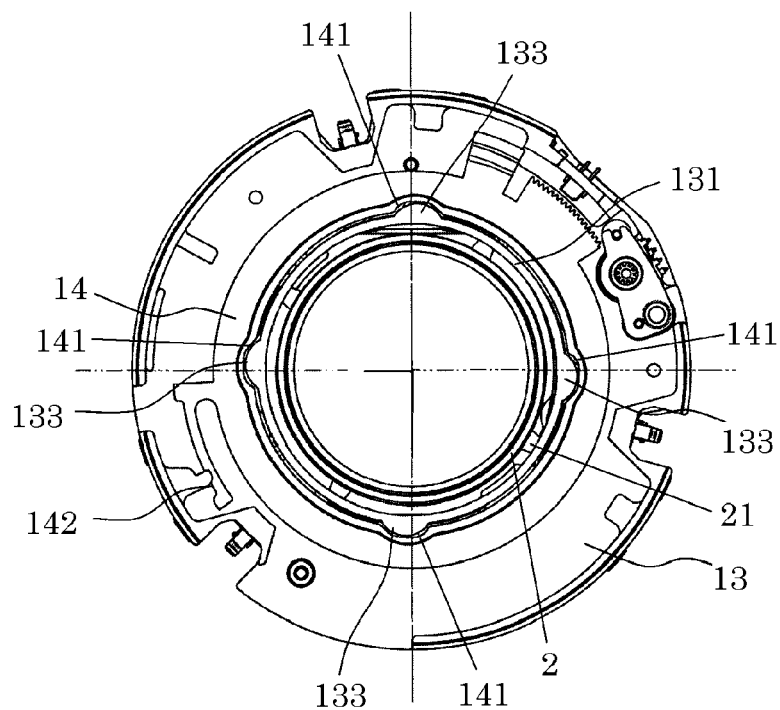
FIGS. 6A and 6B are front views of an optical image stabilizer that is Embodiment 2 of the present invention.
Figure 6B:
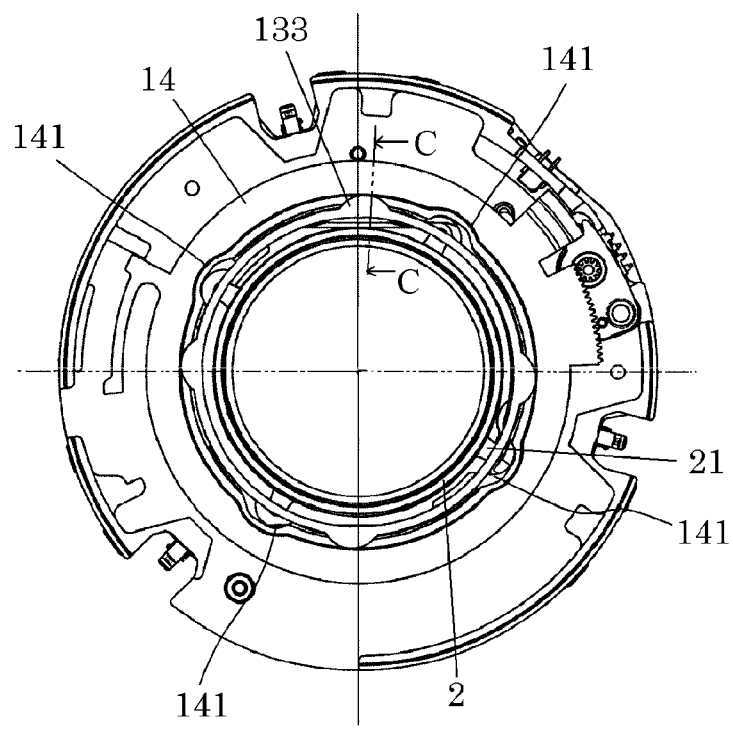
Figure 6C:
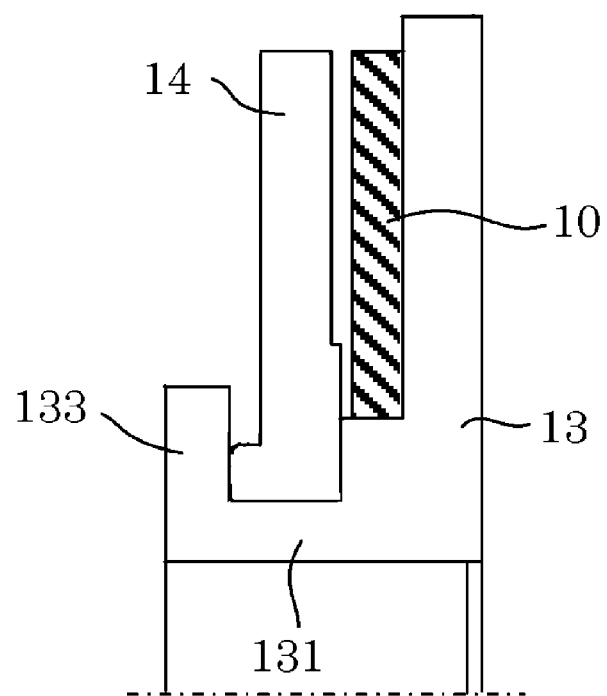
FIG. 6C is a partial enlarged view of a cross-section of the optical image stabilizer of Embodiment 2.

FIGS. 6A and 6B show the optical image stabilizer of Embodiment 2 viewed from the center axis direction. FIG. 6A shows assembling of a lock ring 14 to a base plate 13. FIG. 6B shows the lock ring 14 that has been assembled to the base plate 13 and rotated to a lock position. FIG. 6C shows a partial cross-section of the lock ring 14 and the base plate 13 cut along a C-C line in FIG. 6B.

In the base plate 13, a lock ring supporting portion 131 is formed which has a cylindrical shape and rotatably supports an inner circumferential part of the lock ring 14 as in Embodiment 1. Lock ring retaining portions 133 protruding outward in the radial direction are formed at four circumferential places on a center axis direction tip end of the lock ring supporting portion 131. The lock ring retaining portions 133 sandwiches the lock ring 14 between it and protrusions similar to the lock ring retaining protrusions 34 described in Embodiment 1 to prevent movement of the lock ring 14 in the center axis direction.

The lock ring 14 includes, at four circumferential places in its inner circumferential part, unlocking concave portions 141 similar to the unlocking concave portions 111 described in Embodiment 1. A shape and a function of the lock ring 14 are same as those of the lock ring 11 in Embodiment 1, excepting not having assembling concave portions.

In this embodiment, to assemble the lock ring 14 to the base plate 13, the lock ring 14 is placed around the lock ring supporting portion 131 while phases of the unlocking concave portions 141 are matched to those of the lock ring retaining portions 133 as shown in FIG. 6A. Then, the rock ring 14 is rotated while a hook 142 is elastically deformed inward in the radial direction. Such assembling makes it possible that the inner circumferential part of the lock ring 14 is supported by an outer circumferential part of the lock ring supporting portion 131 rotatably between a lock position and an unlock position shown in FIG. 6B.

In this embodiment, the lock ring retaining portions 133 provided on the tip end of the lock ring supporting portion 131 are in contact with the inner circumferential side portion of the lock ring 14 to prevent the movement of the lock ring 14 in the center axis direction. This configuration enables, as compared with the case where the lock ring retaining portions 33 are in contact with the outer circumferential side portion of the lock ring 11 as described in Embodiment 1, reduction of frictional torque generated due to the contact of the lock ring retaining portions 133 with the lock ring 14 in the center axis direction.

Therefore, a combination of the above-described configuration with the rotatable support of the inner circumferential part of the lock ring 14 by the lock ring supporting portion 131 as in Embodiment 1 enables sufficient reduction of the frictional torque generated due to the rotation of the lock ring 14. This results further reduction of the output torque required for the lock actuator 12 and further miniaturization of the lock actuator 12.

[Embodiment 3]

Description will be made of modified examples of lock ring supporting portions provided in a base plate in an optical image stabilizer that is a third embodiment (Embodiment 3) of the present invention with reference to FIGS. 7A and 7B.

Figure 7A:
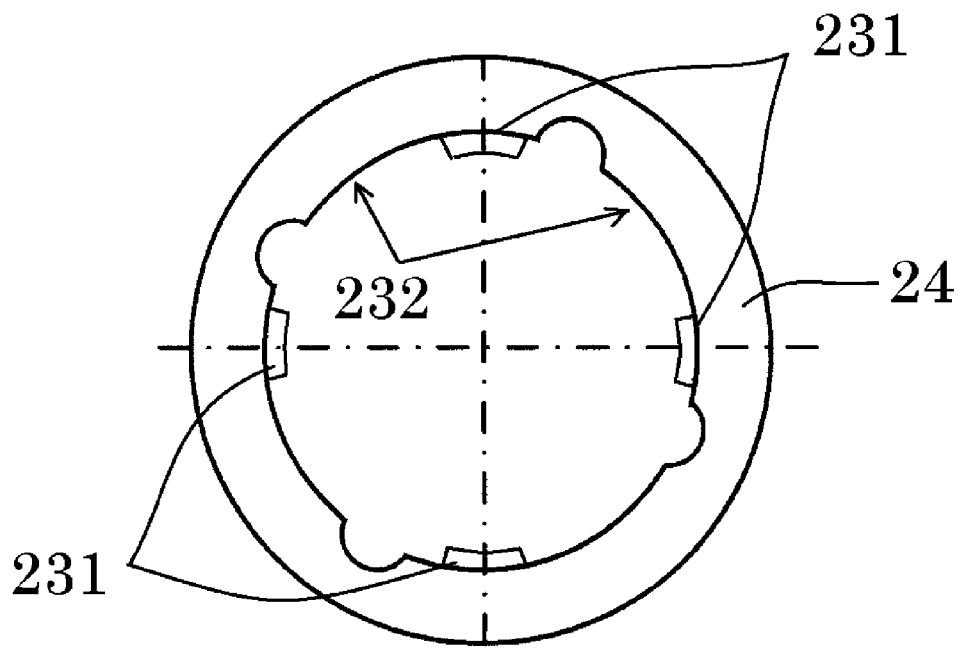
FIGS. 7A and 7B show shapes of supporting portions of optical image stabilizers that are Embodiment 3 of the present invention.

FIG. 7A shows that plural lock ring supporting portions 231 each having a circular arc shape and being arranged on a same circle rotatably support an inner circumferential part of a lock ring 24.

Figure 7B:
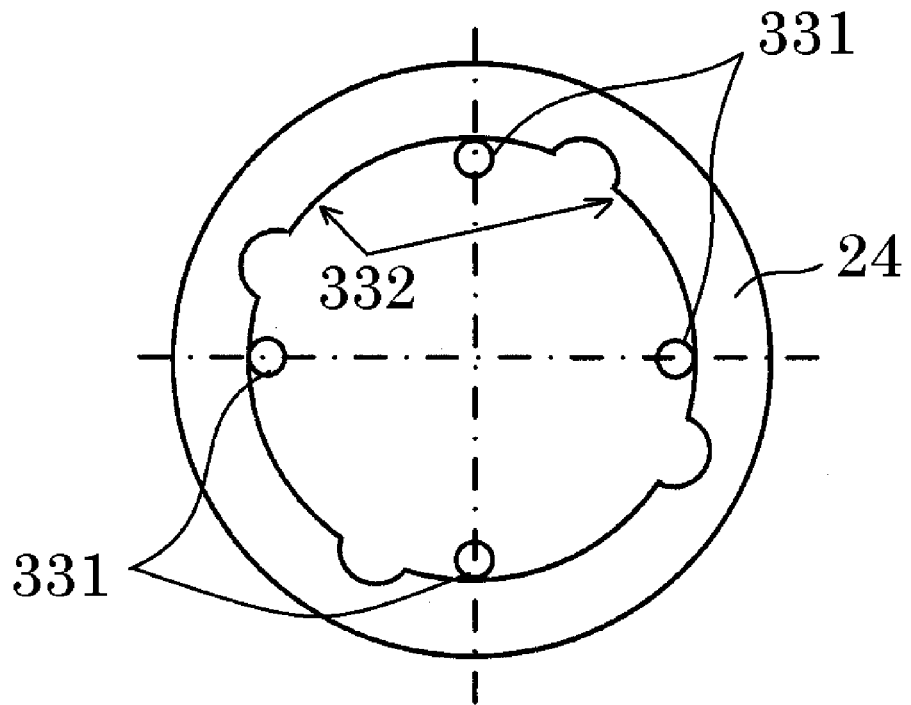

FIG. 7B shows that plural lock ring supporting portions 331 each having a columnar (pin-like) shape and being arranged on a same circle rotatably support the inner circumferential part of the lock ring 24.

In FIGS. 7A and 7B, openings 232 and 332 enabling contact of locking protrusions provided in a shift barrel with locking portions provided in the lock ring 24 are formed between the plural lock ring supporting portions 231 and 331, respectively.

Part of the plural lock ring supporting portions 231 and 331 shown in FIGS. 7A and 7B may be disposed at a position off the circle on which the other lock ring supporting portions 231 and 331 are arranged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although each of Embodiments 1-3 described the case where the optical image stabilizer is installed in the interchangeable lens, the optical image stabilizer may be installed in a lens-integrated camera (optical apparatus).

Moreover, although each of Embodiments 1-3 described the case where the correction lens as the image stabilizing element is moved with respect to the center axis, an image sensor may be moved as the image stabilizing element with respect to the center axis.

This application claims the benefit of Japanese Patent Application No. 2010-046597, filed on Mar. 3, 2010, which is hereby incorporated by reference herein in its entirety.

What is claimed is:

1. An optical image stabilizer comprising:
a shift member holding an image stabilizing element and being movable with respect to a center axis;
a lock member disposed around the shift member and being rotatable about the center axis between a lock position to limit movement of the shift member and an unlock position to release the limit of the movement of the shift member; and
a base member including a supporting portion to rotatably support the lock member,
wherein the shift member includes protrusions at its plural circumferential places,
wherein the lock member includes, in its inner circumferential part, locking portions to receive contact of the protrusions at the lock position so as to limit the movement of the shift member, and
wherein the supporting portion is formed so as to include plural openings allowing contact of the protrusions with the lock portions and so as to support the inner circumferential part of the lock member.

2. An optical image stabilizer according to claim 1, wherein the lock portions and the inner circumferential part of the lock member are arranged on a same circle.

3. An optical image stabilizer according to claim 1, wherein the supporting portion forms a mechanical end for the shift member in a movement direction thereof in a state where the shift member is located at the unlock position.

4. An optical apparatus comprising:
an optical system configured to cause light from an object to form an optical image of the object; and
an optical image stabilizer, wherein the optical image stabilizer comprising:
a shift member holding an image stabilizing element and being movable with respect to a center axis;
a lock member disposed around the shift member and being rotatable about the center axis between a lock position to limit movement of the shift member and an unlock position to release the limit of the movement of the shift member; and
a base member including a supporting portion to rotatably support the lock member,
wherein the shift member includes protrusions at its plural circumferential places,
wherein the lock member includes, in its inner circumferential part, lock portions to receive contact of the protrusions at the lock position so as to limit the movement of the shift member, and
wherein the supporting portion is formed so as to include plural openings allowing contact of the protrusions with the lock portions and so as to support the inner circumferential part of the lock member.

* * * * *